United States Patent
Da Silva et al.

(10) Patent No.: US 11,985,560 B2
(45) Date of Patent: May 14, 2024

(54) SYSTEMS AND METHODS FOR PREVENTING HANDOVER CAUSED BY AN INSECURE MESSAGE FROM A NETWORK NODE

(71) Applicant: TELEFONAKTIEBOLAGET LM ERICSSON (PUBL), Stockholm (SE)

(72) Inventors: Icaro L. J. Da Silva, Solna (SE); Patrik Rugeland, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 402 days.

(21) Appl. No.: 17/281,494

(22) PCT Filed: Jun. 18, 2019

(86) PCT No.: PCT/IB2019/055107
§ 371 (c)(1),
(2) Date: Mar. 30, 2021

(87) PCT Pub. No.: WO2020/089700
PCT Pub. Date: May 7, 2020

(65) Prior Publication Data
US 2021/0400547 A1    Dec. 23, 2021

Related U.S. Application Data (60) Provisional application No. 62/754,214, filed on Nov. 1, 2018.

(51) Int. Cl.
*H04W 36/00* (2009.01)
*H04W 12/10* (2021.01)
(Continued)

(52) U.S. Cl.
CPC ....... *H04W 36/0094* (2013.01); *H04W 12/10* (2013.01); *H04W 76/10* (2018.02); *H04W 76/27* (2018.02)

(58) Field of Classification Search
None
See application file for complete search history.

(56) References Cited

U.S. PATENT DOCUMENTS

| | | | |
|---|---|---|---|
| 10,750,562 B2 * | 8/2020 | Park | H04W 76/19 |
| 2014/0269613 A1 | 9/2014 | Tiwari et al. | |

(Continued)

FOREIGN PATENT DOCUMENTS

| | | |
|---|---|---|
| CN | 104272793 A | 1/2015 |
| CN | 108293236 A | 7/2018 |

(Continued)

OTHER PUBLICATIONS

Catt, "As security for RRC Re-establishment procedure", 3GPP TSG-WG2 Meeting #103, Gothenburg, Sweden, Aug. 20-24, 2018, pp. 1-11, R2-1811233, 3GPP.

(Continued)

*Primary Examiner* — Otis L Thompson, Jr.

(57) ABSTRACT

Systems, methods, and apparatus for handling messages from network nodes of a wireless communications system are disclosed. An example method performed by a terminal includes receiving a message from a network node. The terminal determines that the message contains a reconfigurationWithSync field and that security is not activated when the message is received. Responsive to the determining, the terminal prevents triggering of a handover operation.

19 Claims, 5 Drawing Sheets

(51) Int. Cl.
*H04W 76/10* (2018.01)
*H04W 76/27* (2018.01)

(56) References Cited

U.S. PATENT DOCUMENTS

| | | |
|---|---|---|
| 2017/0332399 A1 | 11/2017 | Yi et al. |
| 2018/0092156 A1 | 3/2018 | Kim et al. |
| 2018/0317264 A1 | 11/2018 | Agiwal et al. |
| 2019/0394691 A1* | 12/2019 | Shih ................ H04W 36/0072 |
| 2020/0045674 A1* | 2/2020 | Tseng .................... H04W 76/14 |
| 2020/0059395 A1* | 2/2020 | Chen .................. H04W 28/082 |
| 2020/0100311 A1* | 3/2020 | Cirik ..................... H04W 72/23 |
| 2020/0337108 A1 | 10/2020 | Wu ........................ H04W 48/20 |
| 2021/0195675 A1* | 6/2021 | Park ....................... H04W 88/14 |
| 2021/0321277 A1* | 10/2021 | Murray ............... H04W 56/001 |

FOREIGN PATENT DOCUMENTS

| | | |
|---|---|---|
| CN | 110431873 A | 11/2019 |
| EP | 2381719 A1 | 10/2011 |
| EP | 2943008 A1 | 11/2015 |
| WO | 2017092813 A1 | 6/2017 |
| WO | 2018030866 A1 | 2/2018 |
| WO | 2018082817 A1 | 5/2018 |
| WO | 2018143703 A1 | 8/2018 |
| WO | 2018174627 A1 | 9/2018 |
| WO | 2018199822 A1 | 11/2018 |
| WO | 2018203815 A1 | 11/2018 |
| WO | 2019032023 A1 | 2/2019 |

OTHER PUBLICATIONS

Ericsson, "Summary of agreements on connection control", 3GPP TSG-RAN WG2 #101Bis, Sanya, P.R. of China, April 16-20, pp. 1-9, R2-1805352, 3GPP.

Ericsson, Change Request "Introduction of SA", 3GPP TSG-WG2 Meeting #103, Gothenburg, Sweden, Aug. 20-24, 2018, pp. 1-431, R2-1813492, 3GPP.

Intel Corporation, Change Request "Security protection for RRC messages", 3GPP TSG-RAN WG2 NR AH Meeting 1807, Montreal, Canada, Jul. 2-6, 2018, pp. 1-4, R2-1809797, 3GPP.

Qualcomm Europe, "Handling of integrity protection check failure", 3GPP TSG-RAN WG2 meeting #62-bis, Warsaw, Poland, Jun. 30-Jul. 4, 2008, pp. 1-4, R2-083572, 3GPP.

Samsung, "Remaining issues of RRC connection control from Inactive", 3GPP TSG-RAN WG2 #99bis, Prague, Czech Republic, Oct. 9-13, 2017, pp. 1-7, R2-1711664, 3GPP.

* cited by examiner

Prior Art

```
┌─────────────────────────────────────────┐
│ Prevent use of content of the reconfigurationWithSync field │
│ for any cell reconfiguration operation by the terminal       │──  500
│ responsive to when a reconfigurationWithSync field of a      │
│ RRCSetup message is determined to be received without        │
│ security protection                                          │
└─────────────────────────────────────────┘
```

Figure 5

```
┌─────────────────────────────────────────┐
│ Prevent use of any content of a RRCSetup message for any     │
│ cell reconfiguration operation by the terminal responsive to │──  600
│ when a reconfigurationWithSync field of the RRCSetup         │
│ message is determined to be received without security        │
│ protection                                                   │
└─────────────────────────────────────────┘
                        │
                        ▼
┌─────────────────────────────────────────┐
│ Report the logged information in a failure report to a network │── 602
│ node                                                            │
└─────────────────────────────────────────┘
```

SYSTEMS AND METHODS FOR PREVENTING HANDOVER CAUSED BY AN INSECURE MESSAGE FROM A NETWORK NODE

The present application is a 371 of International Application No. PCT/IB2019/055107, filed Jun. 18, 2019, which claims the benefit of and priority to U.S. Provisional Patent Application No. 62/754,214, filed Nov. 1, 2018, entitled "HANDLING OF HANDOVER IN RADIO RESOURCE CONTROL SETUP," the disclosures of which are hereby incorporated herein by reference in their entirety.

TECHNICAL FIELD

The present disclosure relates generally to wireless communications systems and, more particularly, to wireless communications and related operations for handling handover relating to a message received from a network node.

BACKGROUND

Figure 1:
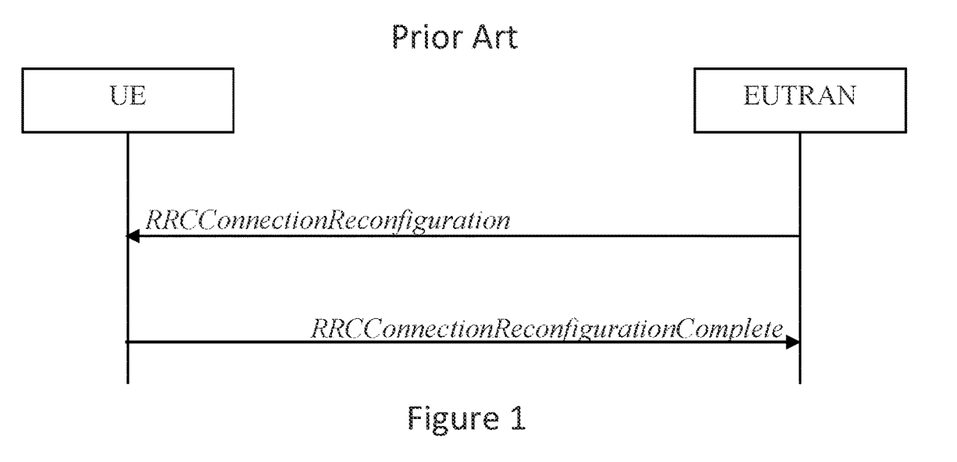
FIG. 1 illustrates communications and related operations performed by a UE and EUTRAN for successful RRC connection reconfiguration.

In LTE, the network could handover a user equipment (UE) from one cell to another by transmitting an RRCConnectionReconfiguration message, including a mobilityControlInfo field. Figure illustrates communications and related operations performed by a UE and Evolved Universal Terrestrial Access Network (EUTRAN) for successful RRC connection reconfiguration. The condition to include mobilityControlInfo is that it is mandatory in case of handover within E-UTRA or to E-UTRA, otherwise it is absent. The mobilityControlInfo field and associated information element (IE) contain the information the UE needs to connect to the target cell. The mobilityControlInfo field may only be included in the RRCConnectionReconfiguration message.

In NR, handovers (reconfiguration with sync) are triggered by the transmission from network to the UE of an NR RRCReconfiguration message which contains RadioBearerConfig (configuring the PDCP and SOAP layers) and CellGroupConfig (configuring the lower layers). The CellGroupConfig contains the IE SpCellConfig, which in turn contain reconfigurationWithSync, which is used during handover.

In the RRC specification, conditions for certain fields and IEs to be included in RRC messages are defined. They define, for example, under which conditions an optional parameter must be included, otherwise an intended procedure would not make sense.

Figure 2A:
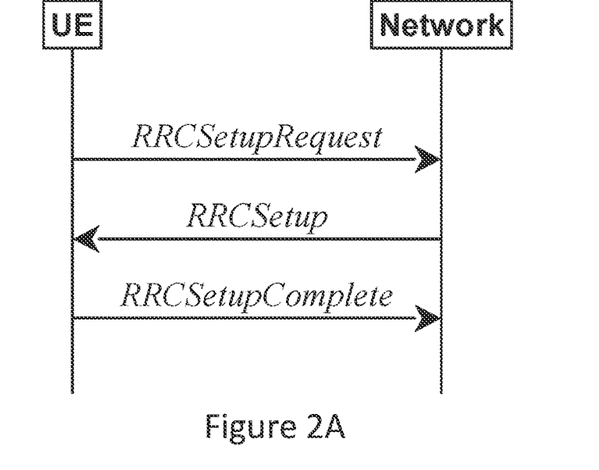
FIG. 2A illustrates communications and related operations performed by a UE and network node for successful RRC connection reconfiguration.
Figure 2B:
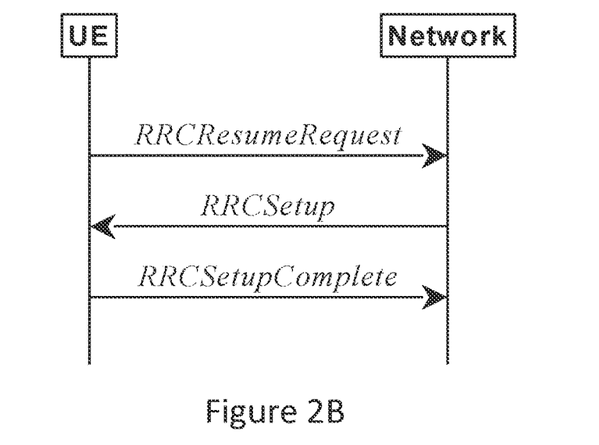
FIG. 2B illustrates communications and related operations performed by a UE and network node for successful RRC connection resume fallback to RRC connection establishment.

The procedures for RRCReconfiguration and Reconfiguration with sync are described in in NR 3GPP TS 38.331 (v15.3.0). For a UE in RRC_IDLE, or during a fallback procedure of e.g. RRC Resume, the network can transmit a RRCSetup message to the UE. FIG. 2A illustrates communications and related operations performed by a UE and network node for successful RRC connection reconfiguration. FIG. 2B illustrates communications and related operations performed by a UE and network node for successful RRC connection resume fallback to RRC connection establishment. The RRCSetup message is transmitted unprotected on SRB0 and is described in 3GPP TS 38.331 (v15.3.0).

SUMMARY

The examples described in the present disclosure provides techniques for improving user equipment security, such as by preventing a user equipment from being caused to handover to a malicious base station. Other advantages may be readily apparent to one having skill in the art. Certain examples may have none, some, or all of the recited advantages.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method by a terminal for handling messages from network nodes of a wireless communications system, the method including: receiving a message from a network node. The method also includes determining that the message contains a reconfigurationwithsync field and that security is not activated when the message is received. The method also includes responsive to the determining, preventing triggering of a handover operation. Other examples of this aspect include corresponding computer systems, apparatus, and computer programs recorded on one or more computer storage devices, each configured to perform the actions of the methods.

BRIEF DESCRIPTION OF THE DRAWINGS

The accompanying drawings, which are included to provide a further understanding of the disclosure and are incorporated in a constitute a part of this application; illustrate certain non-limiting examples of inventive concepts.

DETAILED DESCRIPTION

There currently exist certain challenges with handover techniques. For example, the protocols described above may allow a fake base station to use RRC messaging to cause a UE to perform handover to the fake base station.

Inventive concepts will now be described more fully hereinafter with reference to the accompanying drawings, in which examples of inventive concepts are shown. Inventive concepts may, however, be embodied in many different forms and should not be construed as limited to the examples set forth herein. Rather, these examples are provided so that this disclosure will be thorough and complete, and will fully convey the scope of present inventive concepts to those skilled in the art. It should also be noted that these examples are not mutually exclusive. Components from one example may be tacitly assumed to be present/used in another example.

The following description presents various examples of the disclosed subject matter. These examples are presented as teaching examples and are not to be construed as limiting the scope of the disclosed subject matter. For example, certain details of the described examples may be modified, omitted, or expanded upon without departing from the scope of the described subject matter. The term "terminal" is used in a non-limiting manner and, as explained below, can refer to any type of radio communication terminal. The term "terminal" herein may be interchangeable replaced with the term "radio terminal," "radio communication terminal," "radio device," or "user equipment (UE)."

As explained above, the previously disclosed protocols may allow a fake base station to use RRC messaging to cause a UE to perform handover to the fake base station. More particularly, the current condition for the IE reconfigurationWithSync states that it is mandatory present in case of of SpCell change, PSCell addition, SI update for PSCell and security key change; and otherwise it is optional. Since the RRCSetup message contain the CellGroupConfig (in the masterCellGroupConfig), which includes the spCell-Config, the condition for reconfigurationWithSync would be optional to include.

If a UE receives an RRCSetup containing a reconfigurationWithSync, the UE actions are in the best case ambiguous. Some UEs may try to handover to another cell and transmit the RRCSetupComplete message to that newly indicated cell. According to the NR RRC specifications, that RRCSetup message is sent on SRB0, hence, it is sent unprotected. Consequently, a fake base station may try to do that when the UE attempts to perform the initial connection establishment, or during RRC Resume, the fake base station could force the UE to handover to the fake base station.

Accordingly, methods and operations are disclosed herein for a UE to handle a reconfiguration message. These methods and operations may include:

Step 1—Receiving an unprotected message (e.g. on SRB0) including a field that shall only be sent in a protected message, such as a handover command (or equivalent field, e.g. mobilityControlInfo or reconfigurationWithSync);

Step 2—Upon the occurrence of the event described in Step 1, performing a recovery procedure, and providing a failure indication to upper layers. The recovery procedure may be a transition to RRC_IDLE and the indication may be an 'RRC connection failure';

Step 3—Logging information about the detection associated with Step 1 and Step 2. Information may be logged at the cell where the failure occurs, and indicate at least parts of the message that were sent unprotected; and Step 4—Reporting the logged information described in Step 3. That may be reported upon request from the network.

In one further example; the procedure for reconfigurationWithSync are extended to check whether it was received when security is not activated. If the UE receives the reconfigurationWithSync_unprotected, it performs action going to RRC_IDLE, and possibly report the failure to the UE when it connects to the network.

In another example, conditions are added to the fields that shall be sent only in secure message, such as the reconfigurationWithSync. In the case of RRCSetup, it may be defined that the field shall not be included in the message so that upon inclusion, the UE ignores the field or perform recovery actions, such as performing a NAS recovery.

Embodiments disclosed herein providing advantages, including avoiding or preventing a fake base station from causing handover of a UE that attempts to setup an RRC connection to the fake base station. The network may be informed of the attack (if it is reported) and may then take appropriate actions.

In more general terms, these examples may include defining particular UE actions that are to be taken responsive to receiving in an unprotected message a field (or equivalent, e.g., information element) that shall be sent protected according to the conditions in the specifications. The UE behavior can thereby be predictable and, because of the defined recovery procedures, there is a reduced risk of attacks since the UE will try to come back to the real network and/or re-authenticate itself in case the failure is originated due to a fake base station.

Various examples can also define operations for logging and reporting of information associated with the failure, when it happens, so that the real network has an opportunity to detect that there might be a fake base station in a particular location acting at a particular time. The real network can thereby initiate remedial actions responsive to the notification.

In some examples, when the UE transmits an RRCSetupRequest, RRCResumeRequest or RRCResumeRequest1 this message will be sent unprotected on SRB0 (i.e. not ciphered or integrity protected, although the Resume Request messages contain a security token used for authentication). The network would then respond with the RRCSetup message, which contain the RadioBearerConfig and the CellGroupConfig, which is used to configure SRB1. However, since security has not been activated yet, the RRCSetup message is also sent unprotected. After the reception of the RRCSetup message, the network transmits the SecurityModeCommand (SMC), which contain the configuration required to activate the security (i.e. an indication of which security algorithms to use). The SMC is also sent unciphered, but it is integrity protected. However, since the condition for the reconfigurationWithSync IE in the CellGroupConfig IE is optional to include, the UE would perform the procedures specified for the Reconfiguration with Sync. This means that the UE may synchronize to the cell indicated in the reconfigurationWithSync and would then complete the connection establishment procedure towards that cell. If the target node would then transmit the SMC, including the null algorithms, the UE would activate security without actually protecting the messages (since the null algorithms doesn't add any protection), FIG. 3 is a flowchart of operations that may be performed by a terminal, such as a UE, for handling messages from network nodes of a wireless communications system in accordance with some examples of the present disclosure.

Figure 3:
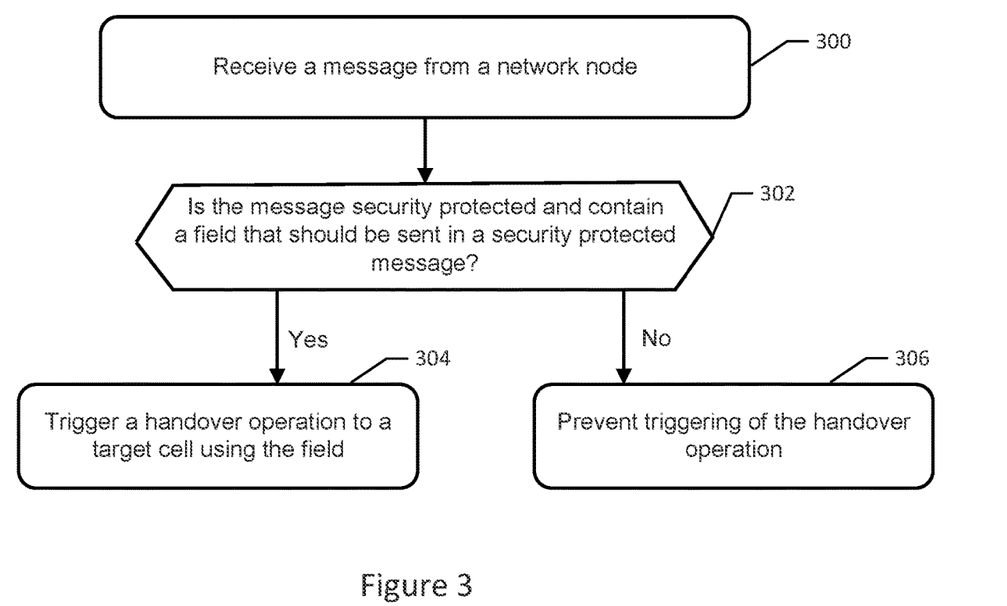
FIGS. 3, 4, 5, and 6 are flowcharts of operations that may be performed by a terminal, such as a UE, for handling messages from network nodes of a wireless communications system in accordance with some examples of the present disclosure.

Referring to FIG. 3, the operations receive 300 a message from a network node, and determine 302 whether the message is security protected and contains a field that should be sent in a security protected message. Responsive to when the determination is that the message is security protected, the operations trigger 304 a handover operation to a target cell using the field. In contrast, responsive to when the determination is that the message is security unprotected and the field should be sent in a security protected message, the operations prevent 306 triggering of the handover operation.

In a further example, the step of determining 302 whether the message is security protected and contains a field that should be sent in a security protected message, includes determining whether the message contains a handover command that is security protected. The step of responsive to when the determination is that the message is security protected, triggering 304 a handover operation to a target cell using the field, includes triggering the handover operation to the target cell using information in the handover command. The step of responsive to when the determination is that the message is security unprotected and the field should be sent in a security protected message, preventing 306 triggering of the handover operation, includes preventing triggering of the handover operation using the information in the handover command.

The handover command may be received 300 in a mobilityControlInfo field of the message. The step of determining 302 whether the message is security protected and contains a field that should be sent in a security protected message, may include determining whether the mobilityControlInfo field of the message is security protected.

The handover command may be received 300 in a reconfigurationWithSync field of the message. The step of determining 302 whether the message is security protected and contains a field that should be sent in a security protected message, may include determining whether the reconfigurationWithSync field of the message is security protected.

Some further examples are directed to handover operations that may be performed in E-UTRA or to E-UTRA, or another wireless communications system. The step of determining 302 whether the message is security protected and contains a field that should be sent in a security protected message, may include determining whether the message is an RRCConnectionReconfiguration message that is security protected and contains a mobilityControlInfo field. The step of responsive to when the determination is that the message is security protected, triggering 304 a handover operation to a target cell using the field, may include triggering the handover operation to the target cell using information in the mobilityControlInfo field. The step of responsive to when the determination is that the message is security unprotected and the field should be sent in a security protected message, preventing 6 triggering of the handover operation, may include preventing triggering of the handover operation using the information in the mobilityControlInfo field.

Some further examples are directed to handover operations that may be performed a NR wireless communications system. The step of determining 302 whether the message is security protected and contains a field that should be sent in a security protected message, may include determining whether the message is a RRCReconfiguration message that is security protected and contains a RadioBearerConfig and CellGroupConfig. The step of responsive to when the determination is that the message is security protected, triggering 304 a handover operation to a target cell using the field, may include triggering the handover operation to the target cell using the RadioBearerConfig and CellGroupConfig. The step of responsive to when the determination is that the message is security unprotected and the field should be sent in a security protected message, preventing triggering of the handover operation using the RadioBearerConfig and CellGroupConfig.

The step of determining whether the message is a RRCReconfiguration message that is security protected and contains a RadioBearerConfig and CellGroupConfig, may include determining whether the message comprises a reconfigurationWithSync field that is security protected.

In some further examples, when the determination is that the message is security protected, the step of triggering 304 the handover operation to the target cell uses a reconfigurationWithSync field contained in the message. Responsive to when the determination is that the message is security unprotected and the field should be sent in a security protected message, the step of preventing 306 triggering of the handover operation prevents use of the reconfigurationWithSync field contained in the message for a handover operation.

The step of triggering 304 the handover operation to the target cell using the reconfigurationWithSync field contained in the message, may include performing a synchronizing operation to the downlink of a target cell indicated by the reconfigurationWithSync field, and performing a connection establishment procedure towards the target cell.

The step of determining 302 whether the message is security protected include determining whether the message has cipher protection and/or whether the message has integrity protection.

In the present example, the UE goes to RRC_IDLE when receiving an unprotected reconfigurationWithSync message. The procedures for reconfiguration with sync may be extended to describe the UE behavior in case the UE receives the reconfigurationWithSync (or equivalent field indicating a handover and/or SCG addition) in an unprotected message. For example, when the UE enters the procedure for Reconfiguration With Sync, it checks whether security has been activated. If security is not activated, the UE performs the actions upon going to RRC_IDLE and notifies the higher layer as shown below. Corresponding operations according to this example may include the following, which may be a modification to 3GPP TS 38.331 (v15.3.0):

5.3.5.5.2 Reconfiguration with Sync

The UE shall perform the following actions to execute a reconfiguration with sync.

1> if the security is not activated, perform the actions upon going to RRC_IDLE as specified in 5.3.11 with the release cause 'other' upon which the procedure ends;
1> stop timer T310 for the corresponding SpCell, if running;
1> start timer T304 for the corresponding SpCell with the timer value set to t304, as included in the reconfigurationWithSync;
1> if the frequencyInfoDL is included:
   2> consider the target SpCell to be one on the SSB frequency indicated by the frequencyInfoDL with a physical cell identity indicated by the physCellId;
1> else:
   2> consider the target SpCell to be one on the SSB frequency of the source SpCell with a physical cell identity indicated by the physCellId;
1> start synchronising to the DL of the target SpCell;
1> apply the specified BCCH configuration defined in 9.1.1.1;
1> acquire the MIB, which is scheduled as specified in 3GPP TS 38.213 [13];
1> perform the actions specified in section 5.2.2.4.1;
NOTE: The UE should perform the reconfiguration with sync as soon as possible following the reception of the RRC message triggering the reconfiguration with sync, which could be before confirming successful reception (HARQ and ARQ) of this message.
1> reset the MAC entity of this cell group;
1> consider the SCell(s) of this cell group, if configured, to be in deactivated state;
1> apply the value of the newUE-Identity as the C-RNTI for this cell group;

Editors Note: Verify that this does not configure some common parameters which are later discarded due to e.g. SCell release or due to LCH release.
1> configure lower layers in accordance with the received spCellConfigCommon;
1> configure lower layers in accordance with any additional fields, not covered in the previous, if included in the received reconfigurationWithSync.

Figure 4:
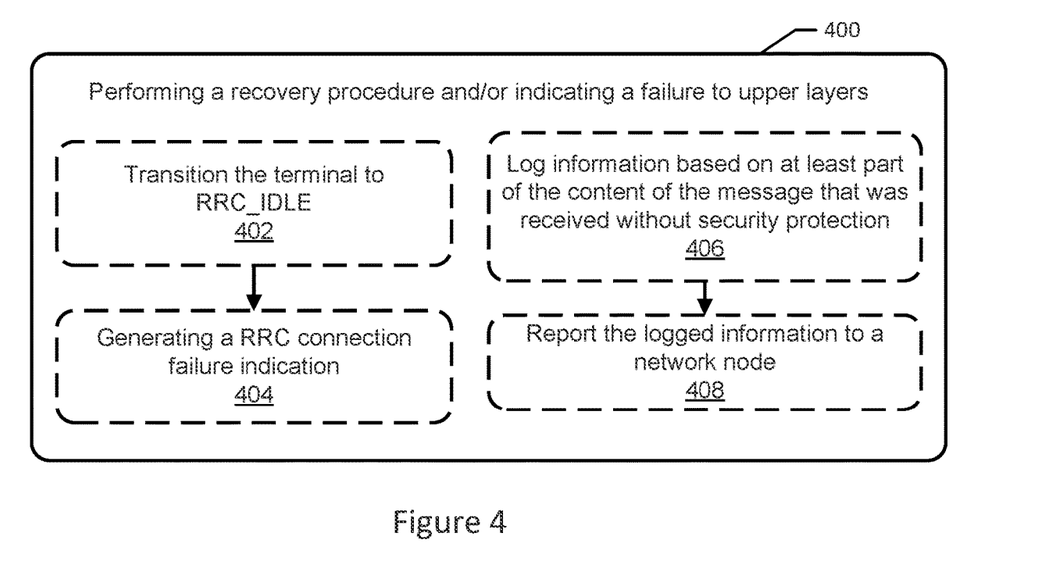

FIG. 4 is a flowchart of corresponding operations that may be performed by a terminal, such as a UE, for handling messages from network nodes of a wireless communications system in accordance with the above example of the present disclosure.

Referring to FIG. 4, the operations include responsive to when the determination is that the message is security unprotected and the field should be sent in a security protected message, performing 400 a recovery procedure and/or indicating a failure to upper layers.

The recovery procedure may include transitioning 402 the terminal to RRC_IDLE. The failure indicated to the upper layers may include an RRC connection failure indication.

The step of responsive to when the determination is that the message is security unprotected and the field should be sent in a security protected message, performing 400 a recovery procedure and/or indicating a failure to upper layers, may include responsive to when a reconfigurationWithSync field of the message is determined to be received without security protection, transitioning 402 the terminal to RRC_IDLE.

The operations may include responsive to when the determination is that the message is security unprotected and the field should be sent in a security protected message, logging 406 information based on at least part of the content of the message that was received without security protection. The operations may further include reporting 408 the logged information to a network node.

In another example, the UE ignores the reconfigurationWithSync IE if it is received unprotected. For example, the UE may consider the IE reconfigurationWithSync if the security has been activated. If security is not activated the UE ignores that IE. Corresponding operations according to this example may include the following, which may be a modification to 3GPP TS 38.331 (v15.3.0):

5.3.5.5 Cell Group Configuration
5.3.5.5.1 General
The network configures the UE with Master Cell Group (MCG), and zero or one Secondary Cell Group (SCG). For EN-DC, the MCG is configured as specified in TS 36.331 [10]. The network provides the configuration parameters for a cell group in the CellGroupConfig IE.
The UE performs the following actions based on a received CellGroupConfig IE:
  1> if the CellGroupConfig contains the spCellConfig with reconfigurationWithSync and security has been activated:
    2> perform Reconfiguration with sync according to 5.3.5.5.2;
    2> resume all suspended radio bearers and resume SCG transmission for all radio bearers, if suspended;
  1> if the CellGroupConfig contains the rlc-BearerToReleaseList:
    2> perform RLC bearer release as specified in 5.3.5.5.3;
  1> if the CellGroupConfig contains the rlc-BearerToAddModList:
    2> perform the RLC bearer addition/modification as specified in 5.3.5.5.4;
  1> if the CellGroupConfig contains the mac-CellGroupConfig:
    2> configure the MAC entity of this cell group as specified in 5.3.5.5.5;
  1> if the CellGroupConfig contains the sCellToReleaseList:
    2> perform SCell release as specified in 5.3.5.5.8;
  1> if the CellGroupConfig contains the spCellConfig:
    2> configure the SpCell as specified in 5.3.5.5.7;
  1> if the CellGroupConfig contains the sCellToAddModList
    2> perform SCell addition/modification as specified in 5.3.5.5.9.

Figure 5:
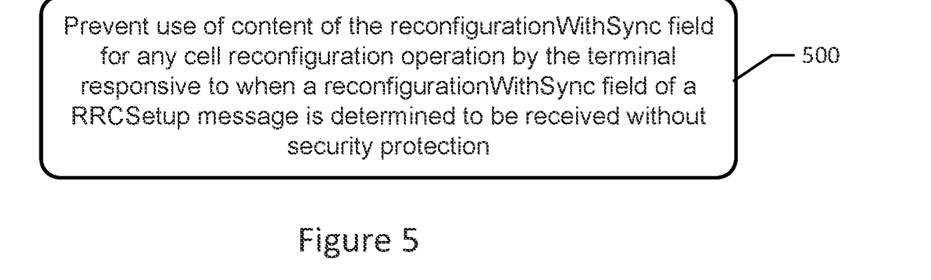

FIG. 5 is a flowchart of corresponding operations that may be performed by a terminal, such as a UE, for handling messages from network nodes of a wireless communications system in accordance with the above example of the present disclosure.

Referring to FIG. 5, the operations include responsive to when a reconfigurationWithSync field of the message is determined 302 to be received without security protection, preventing 500 use of content of the reconfigurationWithSync field for any cell reconfiguration operation by the terminal.

In another example, the UE ignores the whole RRCSetup message if it includes reconfigurationWithSync. The procedures for reception of the RRCSetup message may be modified so that if the message includes the reconfigurationWithSync, the UE should disregard the whole message. In a sub-example, the UE also stores information about the incorrect message, and reports it to the network in a failure report when it later returns to RRC_CONNECTED. The information that is logged and reported may comprise fields, parts of the message or the whole message. When that is reported to the real network, the real network may inspect what has happened. That may include additional information related to location (e.g. positioning, cell identifier(s), etc.), time, radio measurements, etc. Neighbour cell measurement may also be included. Corresponding operations according to this example may include the following, which may be a modification to 3GPP TS 38.331 (v15.3.0):

5.3.3.4 Reception of the RRCSetup by the UE
The UE shall perform the following actions upon reception of the RRCSetup:
  1> if the masterCellGroup included in the RRCSetup message contain the reconfigurationWithSync in the SpCellConfig:
    2> set the failureType to setupSecurityFailure;
    2> the procedure ends;
  1> if the RRCSetup is received in response to an RRCReestablishmentRequest; or
  1> if the RRCSetup is received in response to an RRCResumeRequest or RRCResumeRequest1:
    2> discard the stored UE AS context, fullI-RNTI and shortI-RNTI;
    2> indicate to upper layers fallback of the RRC connection;
  1> perform the cell group configuration procedure in accordance with the received masterCellGroup and as specified in 5.3.5.5;
  1> perform the radio bearer configuration procedure in accordance with the received radioBearerConfig and as specified in 5.3.5.6;
  1> if stored, discard the cell reselection priority information provided by the cellReselectionPriorities or inherited from another RAT;
  1> stop timer T300, T301 or T319 if running;

Editor's Note: FFS Whether there is a need to define UE actions related to access control timers (equivalent to T302, T303, T305, T306, T308 in LTE). For example, informing upper layers if a given timer is not running.
1> stop timer T320, if running;
1> if the RRCSetup is received in response to an RRCResumeRequest or RRCSetupRequest:
  2> enter RRC_CONNECTED;
  2> stop the cell re-selection procedure;
1> consider the current cell to be the PCell;
1> set the content of RRCSetupComplete message as follows:
  2> if upper layers provide an 5G-S-TMSI:
    3> if the RRCSetup is received in response to an RRCSetupRequest:
      4> set the ng-5G-S-TMSI-Value to ng-5G-S-TMSI-Part2;
    3> else:
      4> set the ng-5G-S-TMSI-Value to ng-5G-S-TMSI;
  2> set the selectedPLMN-Identity to the PLMN selected by upper layers (TS 24.501 [23]) from the PLMN(s) included in the plmn-IdentityList in SIB1;
  2> if the masterCellGroup contains the reportUplinkTxDirectCurrent:
    3> include the uplinkTxDirectCurrentList;
  2> if upper layers provide the 'Registered AMF':
    3> include and set the registeredAMF as follows:
      4> if the PLMN identity of the 'Registered AMF' is different from the PLMN selected by the upper layers:
        5> include the plmnIdentity in the registeredAMF and set it to the value of the PLMN identity in the 'Registered AMF' received from upper layers;
      4> set the amf-Identifier to the value received from upper layers;
    3> include and set the guami-Type to the value provided by the upper layers;
Editor's Note: FFS Confirm whether the guard-Type is included and set in the abovementioned condition.
  2> if upper layers provide one or more S-NSSAI (see TS 23.003 [20]):
    3> include the s-nssai-List and set the content to the values provided by the upper layers;
  2> set the dedicatedNAS-Message to include the information received from upper layers;
1> submit the RRCSetupComplete message to lower layers for transmission, upon which the procedure ends FIG. 6 is a flowchart of corresponding operations that may be performed by a terminal, such as a UE, for handling messages from network nodes of a wireless communications system in accordance with the above example of the present disclosure.

Figure 6:
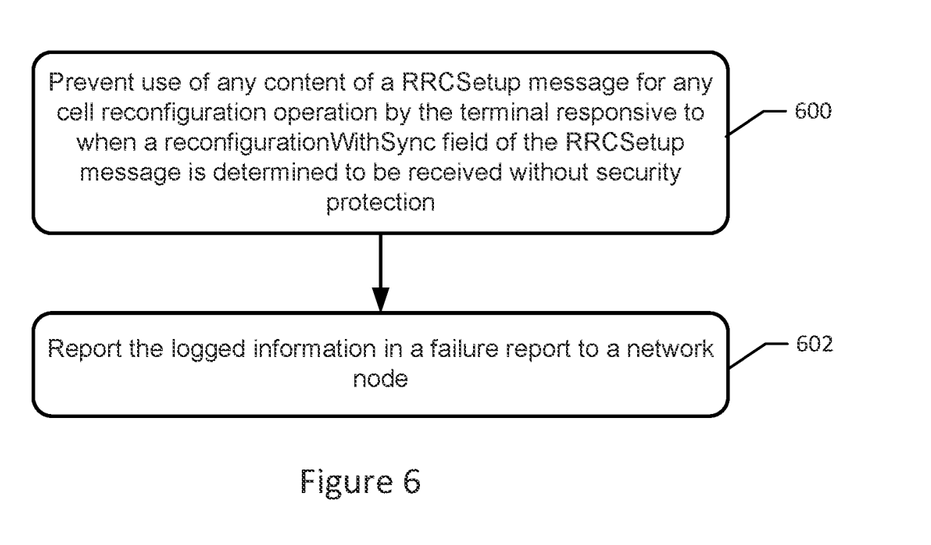

Referring to FIG. 6, the operations include responsive to when a reconfigurationWithSync field of a RRCSetup message is determined to be received without security protection, preventing 600 use of any content of the RRCSetup message for any cell reconfiguration operation by the terminal.

The operations may further include responsive to when a reconfigurationWithSync field of a RRCSetup message is determined 302 to be received without security protection, preventing 600 use of any content of the RRCSetup message for any cell reconfiguration operation by the terminal and logging information based on at least part of the content of the RRCSetup message, and reporting 602 the logged information in a failure report to a network node.

In another example of the present disclosure, the condition of the reconfigurationWithSync is modified to not allow it to be included in RRCSetup, or any unprotected message, or in a message transmitted when security is not activated. It would then be up to UE implementation how to treat the reconfigurationWithSync, e.g.
  Use the configurations
  Ignore the IE (reconfigurationWithSync),
  Ignore the whole message (RRCSetup)
  Below are different sub-examples of the proposed change.

| Sub-Embodiment | |
|---|---|
| Conditional Presence | Explanation |
| ReconfWith Sync | The field is mandatory present in case of SpCell change, PSCell addition, SI update for PSCell and security key change; otherwise it is optionally present, need M. *This field is not present in the RRCSetup message.* |

| Sub-Embodiment | |
|---|---|
| Conditional Presence | Explanation |
| ReconfWith Sync | The field is mandatory present in case of SpCell change, PSCell addition, SI update for PSCell and security key change, otherwise it is optionally present, need M. *This field can only be included if security is activated.* |

| Sub-Embodiment | |
|---|---|
| Conditional Presence | Explanation |
| ReconfWith Sync | The field is mandatory present in case of SpCell change, PSCell addition, SI update for PSCell and security key change; otherwise it is optionally present, need M. *This field can not be included in an unprotected message.* |

Corresponding operations that may be performed by a terminal, such as a UE, can include any one or more the following examples.

In one example, the step of determining 302 whether the message is security protected and contains a field that should be sent in a security protected message, includes when a RRCSetup message is received, determining that the RRCSetup message is security unprotected and contains a field that should be sent in a security protected message whenever the RRCSetup message contains a reconfigurationWithSync field.

In another example, the step of determining 302 whether the message is security protected and contains a field that should be sent in a security protected message, includes when a RRCSetup message is received that has security protection activated, determining that a reconfigurationWithSync field of the RRCSetup message is security protected.

In another example, the step of determining 302 whether the message is security protected and contains a field that should be sent in a security protected message, includes when a RRCSetup message is received that does not have security protection activated, determining that the RRCSetup message contains a field that should be sent in a security protected message whenever the RRCSetup message without active security protection contains a reconfigurationWithSync field.

Thus, various examples of the present disclosure may operate to avoid or prevent operation of fake base stations from including reconfigurationWithSync in the unprotected RRCSetup message to cause UE handover thereto. These examples may modify the UE operations that trigger fallback to RRC_IDLE if the UE receives this IE, or may modify the operations to cause the UE to disregard the whole message.

Figure 7:
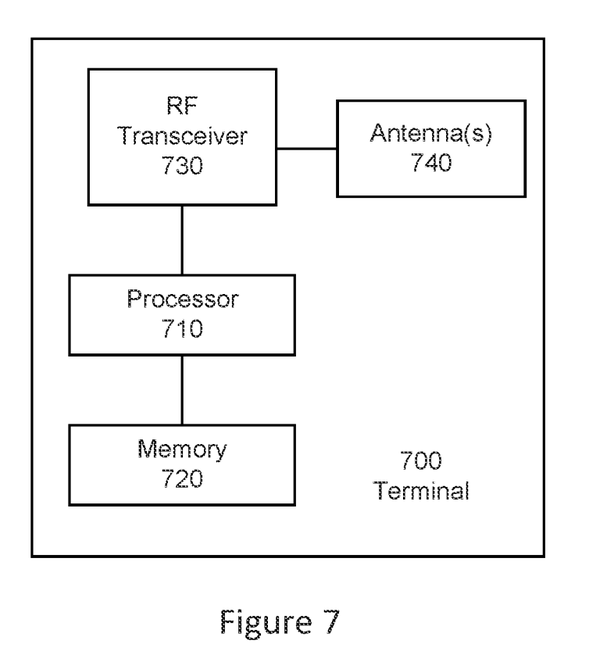
FIG. 7 is a block diagram illustrating a terminal that is configured according to some examples.
Figure 8:
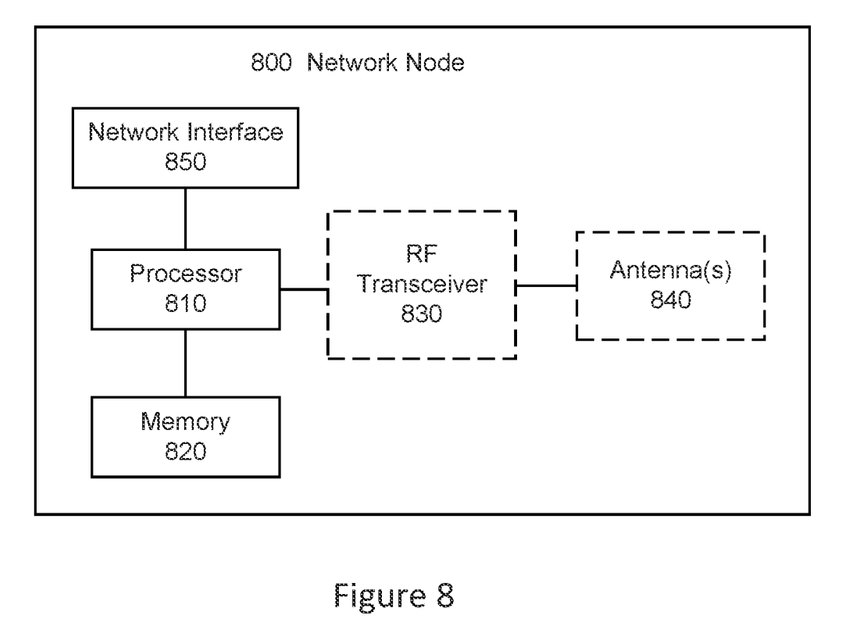
FIG. 8 is a block diagram illustrating a network node of a wireless communication system that is configured according to some examples.

FIG. 7 is a block diagram illustrating a terminal 700 that is configured according to some examples. The terminal 700 can include, without limitation, a wireless terminal, a wireless communication device, a wireless communication terminal, a terminal node, a UE, a communication device, etc. The terminal 700 includes a RF transceiver 730 comprising one or more power amplifiers that transmit and receive through one or more antennas 740 to provide uplink and downlink radio communications with a radio network node (e.g., a base station, eNB, gNB, etc.) of a wireless communication system. The terminal 700 further includes a processor circuit 710 (also referred to as a processor) coupled to the RF transceiver 730 and a memory circuit 720 (also referred to as memory). The memory 720 stores computer readable program code that when executed by the processor 710 causes the processor 710 to perform operations according to examples disclosed herein, FIG. 8 is a block diagram illustrating a network node 800 (e.g., a base station, eNB, gNB, etc.) of a wireless communication system that is configured according to some examples. The network node 800 includes a processor circuit 810 (also referred to as a processor), a memory circuit the 20 (also referred to as memory), and a network interface 850 (e.g., wired network interface and/or wireless network interface) configured to communicate with other network nodes. The network node 800 may be configured as a radio network node containing a RF transceiver 830 with one or more power amplifiers that transmit and receive through one or more antennas 840 which may be part of the network node 800 or may be communicatively connected to but geographically spaced apart from the network node 800. The memory 820 stores computer readable program code that when executed by the processor 810 causes the processor 810 to perform operations according to examples disclosed herein.

The invention claimed is:

1. A method by a terminal for handling messages from network nodes of a wireless communications system, the method comprising:
receiving a message from a network node;
determining that the message contains a reconfigurationWithSync field and that security is not activated; and
responsive to the determining, preventing triggering of a handover operation.

2. The method of claim 1, wherein the message comprises an RRCSetup message.

3. The method of claim 1, wherein preventing triggering of the handover operation comprises transitioning the terminal to an RRC_IDLE state.

4. The method of claim 1, wherein the handover operation comprises a reconfiguration with sync.

5. The method of claim 1, wherein the message is received on SRB0, and wherein the security not being activated includes the message not being cipher or integrity protected.

6. The method of claim 1, further comprising:
indicating a failure to upper layers.

7. The method of claim 6, wherein the failure indicated to the upper layers comprises an RRC connection failure indication.

8. The method of claim 1, further comprising:
logging information based on content of the message that was received without security protection; and
reporting the logged information to one of the network nodes.

9. The method of claim 1, further comprising:
responsive to the determining, preventing use of any content of the message for any cell reconfiguration operation by the terminal.

10. The method of claim 1, wherein one or more of the network nodes are configured to not include a reconfigurationWithSync field in RRCSetup messages.

11. A terminal for handling messages from network nodes of a wireless communications system, the terminal comprising:
a processor; and
a memory coupled to the processor, wherein the memory stores instructions that when executed by the processor causes the processor to perform operations comprising:
receiving a message from a network node;
determining that the message contains a reconfigurationWithSync field and that security is not activated; and
responsive to the determining, preventing triggering of a handover operation.

12. The terminal of claim 11, wherein the message comprises an RRCSetup message.

13. The terminal of claim 11, wherein preventing triggering of the handover operation comprises transitioning the terminal to an RRC_IDLE state.

14. The terminal of claim 11, wherein the handover operation comprises a reconfiguration with sync.

15. The terminal of claim 11, wherein the message is received on SRB0, and wherein the security not being activated includes the message not being cipher or integrity protected.

16. The terminal of claim 11, further comprising:
indicating a failure to upper layers.

17. The terminal of claim 11, further comprising:
logging information based on content of the message that was received without security protection; and
reporting the logged information to one of the network nodes.

18. The terminal of claim 11, wherein one or more of the network nodes are configured to not include a reconfigurationWithSync field in RRCSetup messages.

19. A non-transitory computer readable storage medium comprising computer readable program code that when executed by a processor causes the processor to perform operations comprising:
receiving a message from a network node;
determining that the message contains a reconfigurationWithSync field and that security is not activated; and
responsive to the determining, preventing triggering of a handover operation.

* * * * *